United States Patent
Cho et al.

(10) Patent No.: US 7,988,125 B2
(45) Date of Patent: Aug. 2, 2011

(54) SEAL STRUCTURE AND CONTROL VALVE USING SAID SEAL STRUCTURE

(75) Inventors: Ryosuke Cho, Tokyo (JP); Yoshihiro Ogawa, Tokyo (JP); Kohei Fukudome, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 771 days.

(21) Appl. No.: 11/919,240

(22) PCT Filed: Apr. 21, 2006

(86) PCT No.: PCT/JP2006/308418
§ 371 (c)(1),
(2), (4) Date: Oct. 25, 2007

(87) PCT Pub. No.: WO2006/118051
PCT Pub. Date: Nov. 9, 2006

(65) Prior Publication Data
US 2009/0278068 A1    Nov. 12, 2009

(30) Foreign Application Priority Data

Apr. 27, 2005   (JP) ................................ 2005-130206

(51) Int. Cl.
*F16K 31/02* (2006.01)
(52) U.S. Cl. ................................. 251/129.15
(58) Field of Classification Search ............. 251/129.15, 251/214; 277/910; 137/625.48
See application file for complete search history.

(56) References Cited

U.S. PATENT DOCUMENTS

| | | | | | |
|---|---|---|---|---|---|
| 2,872,221 | A | * | 2/1959 | Burns et al. | 277/582 |
| 5,503,367 | A | * | 4/1996 | Thompson et al. | 251/214 |
| 2005/0189509 | A1 | * | 9/2005 | Peric | 251/129.15 |

FOREIGN PATENT DOCUMENTS

| | | |
|---|---|---|
| JP | 45-14976 | 6/1970 |
| JP | 46-18782 | 6/1971 |
| JP | 60-62667 | 5/1985 |
| JP | 2001-132847 | 5/2001 |
| JP | 2005-061303 A | 3/2005 |

* cited by examiner

*Primary Examiner* — John K Fristoe, Jr.
*Assistant Examiner* — Marina Tietjen
(74) *Attorney, Agent, or Firm* — Arent Fox, LLP

(57) ABSTRACT

A seal structure sealing a fitted part between the guide surface of a bearing part and a shaft part to prevent a fluid from flowing in a direction from a high-pressure fluid side to a low-pressure fluid side. The seal structure comprises a seal ring storage part having a radial contact surface surrounding the shaft part which is formed on the high-pressure fluid side of the bearing part and a seal ring disposed in the seal ring storage part, allowing its side surface facing the contact surface to come into contact with the contact surface, and allowing its inner peripheral surface to be fitted to the outer peripheral surface of the shaft part. The seal ring is formed in such a relative dimension that, even if elastically deformed by the pressure of the sealed fluid, the elastically deformed expanded portion thereof is not brought into contact with the peripheral surface of the seal ring storage part.

3 Claims, 6 Drawing Sheets

SEAL STRUCTURE AND CONTROL VALVE USING SAID SEAL STRUCTURE

CROSS-REFERENCE TO RELATED APPLICATION

This application is a National Stage entry of International Application No. PCT/JP2006/308418, filed Apr. 21, 2006, the entire specification claims and drawings of which are incorporated herewith by reference.

TECHNICAL FIELD

The present invention relates to a switching valve with an enhanced operational performance of the valve body. More particularly, it relates to a switching valve for making a direct opening/closing of the valve body by means of an operational force of a solenoid portion and for preventing pressure of the switched fluid from affecting the operational characteristics of the valve body.

BACKGROUND ART

There is a three-way or four-way valve used for piping of air conditioner and the like as prior art of the present invention (refer to the patent reference 1 given below). Inside the piping of the refrigeration cycle in the air conditioner an operational fluid such as $CO_2$ or the like is used as a refrigerant. In the refrigerant cycle using $CO_2$ as operating fluid, generally the service pressure range becomes more than ten times compared with those of conventional refrigerants. The fact that the service pressure is high causes various problems to a switching valve. FIG. 4 illustrates a refrigeration cycle of this air conditioner. Also FIG. 5 illustrates a heating cycle of the air conditioner. In addition, FIG. 6 shows a full cross-sectional view of a three-way valve used in the cycles of FIG. 4 and FIG. 5.

Construction of the solenoid valve 130 will briefly be described by using FIG. 6. In the valve main body 104, there is disposed a solenoid portion, not shown, to the right hand side of the figure where the reference numeral 130 is placed, in which the solenoid portion is integral with the valve main body 104. And the spool 106 is actuated by supplying an electric current to the solenoid portion. In the valve main body, there is disposed a slide surface 104A on the circumference of an axially extending bore which guides the spool 106. Inside the non cross-sectional portion which is located in the right hand side of FIG. 6, the spool 106 and a spool valve being integral with the spool 106 are disposed in which this spool valve opens or closes the fluid passage at fluid inlet port 112 under discharge pressure and fluid outlet port 113 under control chamber pressure.

Also the fluid inlet port 112 under discharge pressure and the fluid inlet/outlet port 111 under suction pressure are communicated by means of piping having an orifice therebetween. O-ring 125 is mounted in an annular grove which is formed by a recess portion disposed in the valve main body 104 and a support plate 126 in order to prevent the fluid under suction pressure form leaking through the gap between the spool 106 and the sliding surface 104A toward atmospheric chamber 107. There is disposed a spring 109A in the atmospheric chamber 107 which is retained by a spring retainer 109. This spring 109A resiliently urges the spool 106 to the solenoid portion side.

In the solenoid valve 130 thus constructed, O-ring 125 forms an intermediate fit with the spool 106 and the valve main body 104 in order to prevent the fluid at suction pressure in the fluid inlet/outlet port 111 from leaking through the clearance gap between the spool 106 and the sliding surface 104A. This causes the fluid at suction pressure to act on the O-ring 125 from one direction such that the O-ring 125 undergoes elastic deformation in a radial direction. When the solenoid portion is energized by the current supplied to the solenoid portion and actuates the spool 106, frictional resistance of the spool 106 increases due to friction thereof with the O-ring 125. More particularly, since fluid under a highly pressurized suction pressure needs to be sealed in air compressors and the like as previously described, if this fluid of suction pressure acts on the O-ring 125 through between the spool 104 and the sliding surface 104A, then the O-ring 125 undergoes elastic deformation such that the O-ring 125 is squeezed and increases sliding friction relative to the spool 106. As the result, the intensity of the current supplied to the solenoid portion does not remain proportional to the operational speed of the spool 106 and the response of the solenoid valve 130 for controlling the fluid flow may be deteriorated. And besides, the seal ability decreases as the inner circumferential seal face of the O-ring 125 is subject to wear due to press-contact thereat.

Patent reference 1: Japanese Patent Laid-Open Publication No. 2000-193124 (FIG. 3 and FIG. 4)

DISCLOSURE OF THE INVENTION

Technical Problems to be Solved by the Invention

The present invention is proposed for alleviating the above mentioned disadvantages, and the technical problem to be solved by the invention is, by means of the seal structure, to prevent a sealed fluid from leaking between the rod portion and the guide surface of the rod portion after wear of the seal face of a seal ring and to reduce a slide resistance of the rod portion under a relative displacement. Another objective in a control valve adopting this seal structure is not only to prevent a sealed fluid from leaking between the rod portion for actuating the valve body and the guide surface for guiding the rod portion but also to enhance the response of the valve body by reducing the slide resistance during the sliding movement of the rod portion, thereby preventing unwanted forces from acting on the valve body.

Means for Solving the Technical Problems

A primary object of the present invention is to solve the above mentioned technical problems, and a solution to such problems is embodied as follows.

A seal structure related to the present invention is a seal structure for sealing a sealed fluid in the clearance gap between a guide surface of a rod support portion and a rod portion. The seal structure is comprised of a seal ring container portion which is disposed in higher pressure side of the rod support portion and surrounds the rod portion and has a radially extending contact surface, a seal ring which is disposed in the seal ring container portion wherein inner circumferential surface thereof forms a seal-tight contact with the outer circumferential surface of the rod portion, wherein side wall surface thereof opposing the contact surface is in contact with the contact surface, wherein the seal ring and the seal ring container portion are built in a relative dimensional relationship by which elastically expanded portion after elastic deformation due to the sealed fluid pressure is not restricted by the circumferential surface of the seal ring container portion.

A control valve using the seal structure related to the present invention is a control valve for opening/closing a valve body by means of an actuation means for flowing the sealed fluid. The control valve is comprised of a rod portion disposing the valve body, a guide surface fitting the rod portion and providing a guide thereto, a seal ring container portion being disposed in axially one side of the guide surface and in the circumference of the rod portion in a surrounding manner in which the seal ring container portion disposes a radially extending contact surface, a valve chamber being disposed in axially the other side of the guide surface and disposing a valve seat therein in which the valve seat is formed at the periphery of a communication passage through which the operating fluid flows in accordance with opening/closing actions of the valve body, and an auxiliary passageway communicating with the seal ring container portion and introducing the operating fluid, wherein a seal ring is disposed in the seal ring container portion, wherein inner circumferential surface thereof forms a seal-tight contact with the outer circumferential surface of the rod portion, wherein side wall surface thereof opposing the contact surface is in contact with the contact surface, wherein the seal ring and the seal ring container portion are built in a relative dimensional relationship by which elastically expanded portion after elastic deformation due to the sealed fluid pressure is not restricted by the circumferential surface of the seal ring container portion.

Effects of the Invention

According to the seal structure related to the present invention, the seal ring which is disposed in the seal ring container portion which fits the outer circumferential surface of the rod portion and whose side wall surface is in contact with the contact surface wherein the seal ring and the seal ring container portion are built in a relative dimensional relationship by which elastically expanded portion after elastic deformation due to high pressure sealed fluid pressure is not restricted by the circumferential surface of the seal ring container portion, thereby permitting the seal ring to be elastically deformed in radially outward direction. Therefore, as the inner circumferential surface of the seal ring can be prevented from being pressed hard against the rod portion, the seal ring is able to form a sharp surface pressure and exhibit outstanding seal ability. Also it is able to reduce sliding resistance when the rod portion makes a relative movement relative to the seal ring. And besides, wear of the mutual sliding faces is prevented because the inner circumferential surface of the seal ring does not form a hard contact with the rod portion even when a high pressure operating fluid urges the seal ring against the contact surface. As the result, the seal ring not only enhances seal ability thereof but also enhances durability thereof.

According to the control valve using the seal structure related to the present invention, the seal ring is arranged to form a contact with the outer circumferential surface of the rod portion and the contact surface of the seal ring container portion alone. Also as the seal ring container portion communicates with the auxiliary passageway in which an operating fluid under more or less the same operating fluid pressure in the valve body side flows through, the seal ring receives the same operating fluid pressure at both sides in axial direction. Therefore even when the operating fluid pressure acts on the seal ring, the seal ring is permitted to freely exhibit elastic deformation in radially outward direction. Also the seal surface on the inner circumferential surface of the seal ring can effect a seal against high pressure even when the contact with the rod portion is weakened, since the both sides of the seal face along the axial direction receive more or less the same pressure. Besides, in case of a relative movement of the rod portion, the sliding resistance is reduced as the outer circumferential surface of the rod portion is not pressed hard against the inner circumferential surface of the seal ring. As the result, when the actuation means actuates the rod portion for opening/closing the valve body, flow controllability by means of opening/closing of the valve body is enhanced because response of the valve opening/closing action corresponds to a set force of the actuation means.

DESCRIPTION OF REFERENCE NUMERALS

Figure 1:
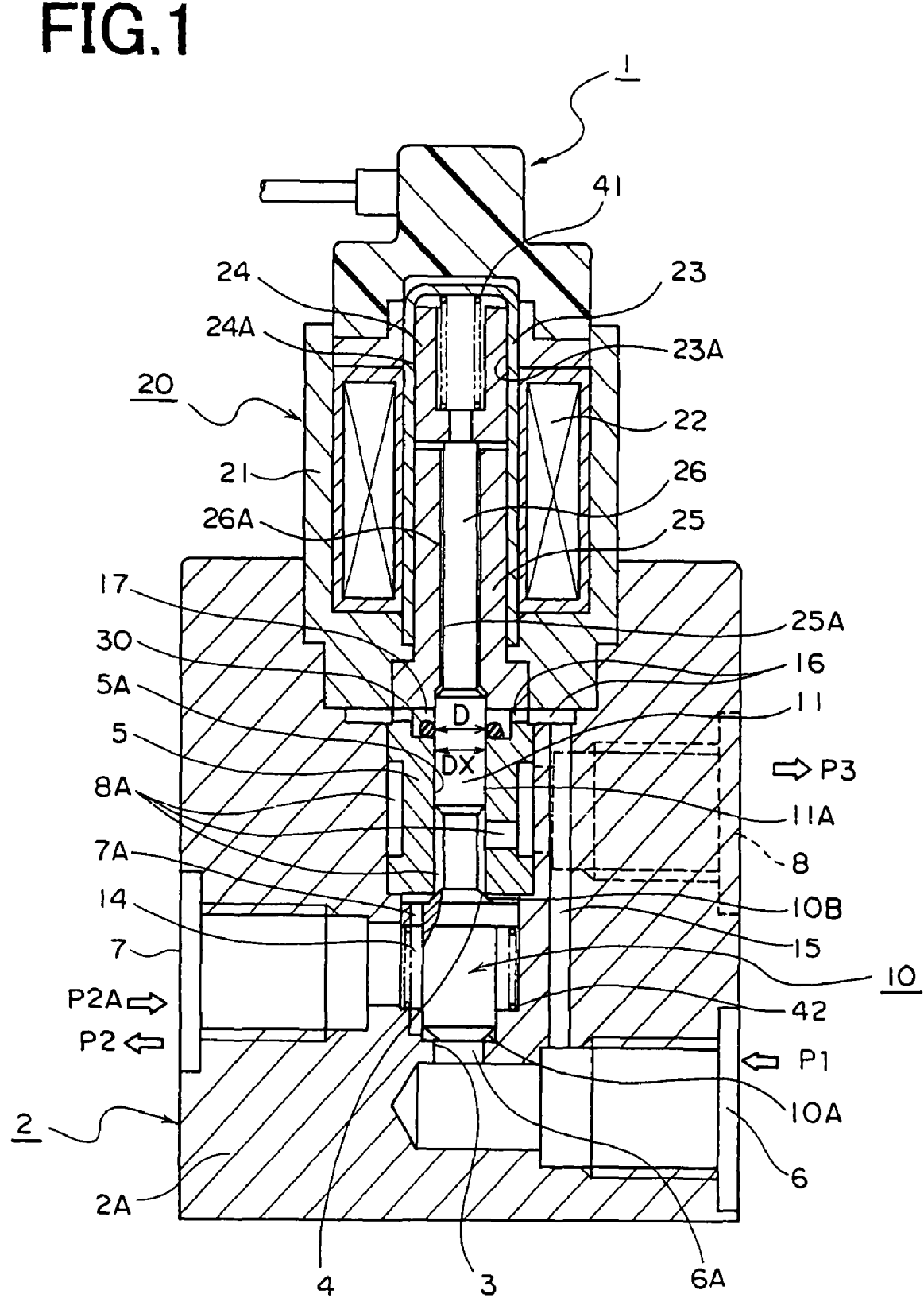
FIG. 1 is a full cross-sectional view of a control valve as a first embodiment of the present invention.

1 control valve
2 valve portion
2A valve housing (valve main body)
3 first valve seat
4 second valve seat
5 rod support portion
5A guide bore
5B circumferential wall
5C contact surface
6 first fluid passage
6A first communication passage
7 second fluid passage
7A second communication passage
8 third fluid passage
8A third communication passage
9 control fluid passage bore
10 valve body
10A first valve face
10B second valve face
11 rod portion
11A outer circumferential surface
11B rod member
12 pressure-sensing chamber
13 pressure-sensing element
14 valve chamber
15 auxiliary passageway
16 introduction passage
17 seal ring container portion (seal ring container chamber)
20 solenoid portion
21 main body
22 coil portion
23 sleeve
23A inner circumferential surface
24 moveable attraction element
24A outer circumferential surface
25 fixed attraction element 25A guide bore
26 solenoid rod
26A outer circumferential sliding surface
30 seal ring
30A inner circumferential surface
30B side surface
32 rotary shaft
35 housing
35A rod support surface
35B circumferential surface
41 auxiliary spring
42 first spring

BEST MODE FOR CARRYING OUT THE INVENTION

Described below is the details of the control valve and the seal structure based on the figures of a preferred embodiment in accordance with the principles of the present invention. All the figures explained below are constructed according to actual design drawings with accurate dimensional relations.

FIG. 1 is a cross-sectional view of a control valve as an embodiment related to the present invention. In FIG. 1, the numeral 1 designates a control valve. The control valve 1 is comprised of a valve portion 2 and a solenoid portion 20. The control valve 1 disposes a valve housing (also referred to as a valve main body) 2A which defines outer form of the valve portion 2. This valve housing 2A disposes a valve chamber 14 in axial center thereof. There is also disposed a first fluid passage 6 which admits a first operating fluid P1 from outside when viewed from the center of this valve chamber 14. A first communication passage 6A is disposed between the first fluid passage 6 and the valve chamber 14. Rotating the first communication passage 6A along the circumference by about 180 degrees, there is disposed a second fluid passage 7 which communicates with the valve chamber 14. The first operating fluid P1 discharged from the first fluid passage 6 is introduced into the second fluid passage 7 as a second operating fluid P2. Also the second operating fluid P2 is introduced from the second fluid passage 7 to the valve chamber 14 as a third operating fluid P2A. Pressure of the third operating fluid P2A may be almost the same as pressure of the first operating fluid P1 in some cases, but it may become lower than the pressure of the first operating fluid P1 in other cases when the second operating fluid P2 operates in the introduction side. And besides, at another location rotating from the second fluid passage 7 along the circumference by about 145 degrees, there is disposed a third fluid passage 8 which communicates with the valve chamber 14. A third communication passage 8A then is disposed between the second fluid passage 7 and the third fluid passage 8. This third fluid passage 8 discharges a fourth operating fluid P3 which was introduced from the second fluid passage 7 as the third operating fluid P2A. Relative locations of the respective first fluid passage 6, second fluid passage 7 and third fluid passage 8 in the valve housing 2A should not be restricted to the above choice of locations, but should be arranged with appropriate spaces therebetween along the circumference from a viewpoint of easy pipe fitting.

Besides, a rod support portion 5 securely engages a through hole which is located in the upper portion in the figure relative to the valve chamber 14. There is disposed a mount bore of a double-step shoulder form at the upper end of the rod support portion 5 in the figure. This mount bore securely fits a solenoid portion 20. Also the upper surface of the rod support portion 5 in the figure disposes a plurality of radially extending groove notches along circumference thereof. Furthermore, outer circumference of the notches in the rod support portion 5 is arranged to form a cavity between the joint surfaces of the valve housing 2A and the solenoid portion 20. Combined this cavity with the notches defines an introduction passage 16. This introduction passage 16 is communicated via auxiliary passageway 15 with the first fluid passage 6. That is, the auxiliary passageway 15 communicates with the first fluid passage 6 at its one end while the other end communicates via the introduction passage 16 with a seal ring container portion (also referred to as seal ring containing chamber) 17. This auxiliary passageway 15 is defined by an axially extending through hole with respect to the valve housing 2A. This auxiliary passageway 15, for instance, can be substituted by communicating with a pipe disposed in the external of the valve housing 2A. The auxiliary passageway 15 receives the first operating fluid P1 from the first fluid passage 6 and transfers it into the seal ring container portion 17. Pressure of the first operating fluid P1 inside the seal ring container portion 17 is typically almost the same as the pressure of the third operating fluid P2A inside the third communication passage 8A or higher than the pressure of the third operating fluid P2A.

In the valve chamber 14, a first valve seat 3 is disposed at the perimeter of the opening of the first communication passage 6A which is perpendicular to the axis of the first fluid passage 6. Likewise, a second valve seat 4 is disposed at the perimeter of the opening of the third communication passage 8A which is opposite the first valve seat 3. Furthermore, the valve chamber 14 disposes a valve body 10 therewithin. This valve body 10 disposes a first valve face 10A which lifts from or rests on the first valve seat 3 for opening/closing. Also the valve body 10 disposes a second valve face 10B which lifts from or rests on the second valve seat 4 for opening/closing. And the valve body 10 fits the inner circumferential surface of the valve chamber 14 in freely slidable manner wherein the second valve face 10B lifts from the second valve seat 4 when the first valve face 10A comes to close the valve with the first valve seat 3. On the contrary, the second valve face 10B comes to close the valve with the second valve seat 4 when the first valve face 10A lifts from the first valve seat 3. That is, when the valve body 10 operates as a three-way valve, the first valve seat 3 and the second valve seat 4 make opening/closing actions in an alternate manner.

Lower portion of the valve chamber 14 sliding relative to the valve body 10 is arranged to form a step shoulder in a small diameter which serves as a passageway communicating the first fluid passage 6 with the second fluid passage 7 for permitting the first operating fluid P1 to flow through. The outer circumference of the small diameter portion receives a first spring 42 in a concentric manner. This first spring 42 resiliently urges the valve body 10 toward the second valve seat 4 side. Large diameter portion of the valve body 10 which is subject to sliding movement disposes a plurality of second communication passages 7A which axially extend therethrough along the circumference. This second communication passage 7A communicates with the third communication passage 8A when the second valve seat 4 opens. Also the third communication passage 8A communicates with the third fluid passage 8 and external piping. Furthermore, the rod support portion 5 forms a fit engagement with the through bore of the valve housing 2A as a separate part from the valve housing 2A. If, however, the third communication passage 8A can be prepared therewithin, the guide surface 5A may directly be fabricated on the inside wall of the valve housing 2A, instead of disposing a rod support portion 5 therewithin. Inner diameter DX of the guide surface 5A in the rod support portion 5 should preferably be similar to the diametral dimension D of the rod portion 11 so as to be slidable to each other.

And the valve housing 2 is produced by using metal such as brass, copper, aluminum, stainless and the like or synthetic resin and the like.

Figure 2:
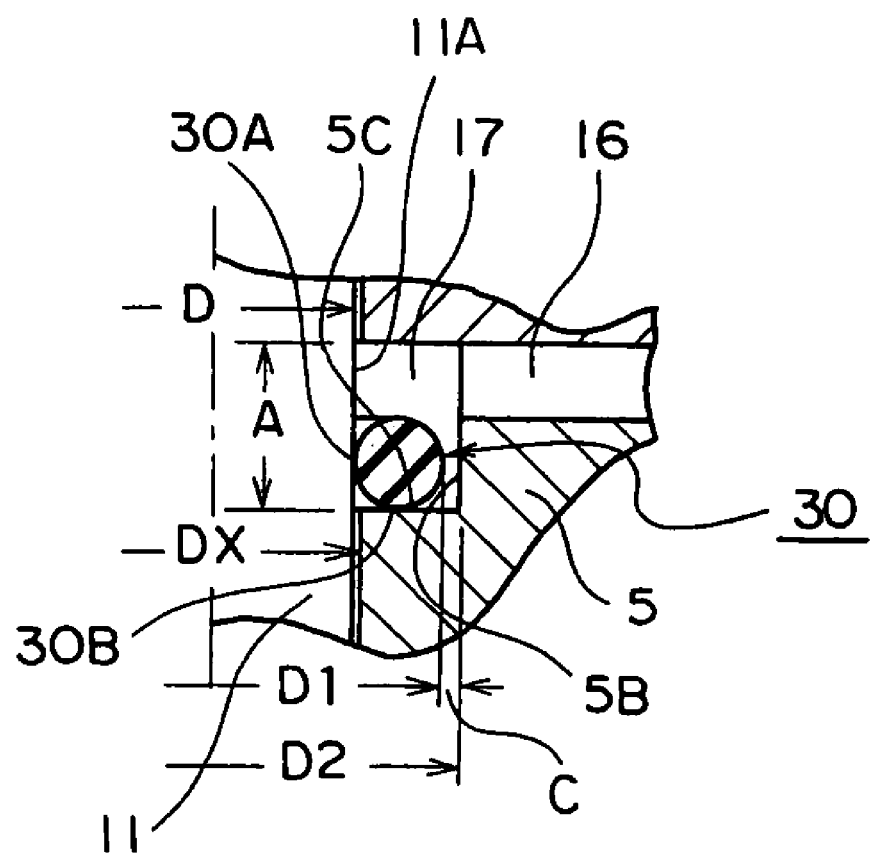
FIG. 2 is an enlarged cross-sectional view of a seal ring container portion and a seal ring disposed in the seal ring container portion shown in FIG. 1.

In the upper portion of the guide bore 5A in the figure, as mentioned earlier, there is disposed a seal ring container portion 17. FIG. 2 illustrates an enlarged view of the vicinity of this seal ring container portion 17. This seal ring container portion 17 is arranged to have a recess form inside a circumferential wall 5B on the upper surface of the rod support portion 5 in which the diameter "D2" of the circumferential wall 5B is larger than the inner diametral dimension "DX" of the guide surface 5A. The seal ring container portion 17, as clearly seen from FIG. 2, is defined by the circumferential wall 5B and a contact surface 5C which is located at the bottom of the recess and spans in a radial direction. The seal ring container portion 17 mounts a seal ring 30 being made of rubber material and with "O"-shaped cross section. A side surface 30B of the seal ring 30 opposing the contact surface 5C of the seal ring 30 forms a contact with the contact surface 5C. Inner circumferential surface 30A of the seal ring 30 comes to form a light contact with the outer circumferential surface 11A of the rod portion 11. And besides, the outer circumferential surface of the seal ring 30 is arranged to remain non-contact relative to the circumferential wall 5B of the seal ring container portion 17 in terms of a dimensional relationship even when it undergoes elastic deformation due to the working pressure. As the seal ring 30 receives the first operating fluid P1 pressure and the third operating fluid P2A pressure from the opposite directions, respectively, leakage to the other side through the seal ring 30 will be minor even when the pressure of the first operating fluid P1 and the third operating fluid P2A is high. Therefore, the inner circumferential surface 30A of the seal ring 30 is allowed to form a light contact with the outer circumferential surface 11A of the rod portion 11.

Diametral dimension "D" of the rod portion 11 is arranged slightly smaller than the inner diameter "DX" of the guide surface 5A so as to permit a relative movement therebetween. Besides, the seal ring 30 prevents the first operating fluid P1 introduced via introduction passage 16 from leaking into the valve chamber 14 through the fit clearance between the outer circumferential surface 11A and the guide surface 5A. The first operating fluid P1 flows into the clearance gap which is formed between an outer circumferential sliding surface 26A of the solenoid rod 26 and a guide bore 25A of a fixed attraction element 25, and acts on the end face of the rod portion 11, thereby pushing the rod portion 11 downward. Then the downward force is counterbalanced by an opposing upward force acted on the valve body 10 and the rod portion 11 by the first operating fluid P1. In this case, diameter "D2" of the 5B of the seal ring container portion 17 should be chosen in such a way that the diameter "D1" of the outer circumferential surface of the seal ring 30 is made smaller by the clearance gap "C" so that the seal ring 30 does not make contact even after the first operating fluid P1 causes the seal ring 30 to undergo elastic deformation. Therefore, even when the seal ring 30 is compressed in axial direction and is flattened and stretched in radial direction, the inner circumferential surface 30A of the seal ring 30 is prevented from being heavily squeezed against the outer circumferential surface 11A of the rod portion 11. More particularly, the seal ring 30 receiving pressure from both ends thereof is stretched in radially outward direction. Thus the inner circumferential surface 30A of the seal ring 30 can maintain outstanding seal performance without increasing a press-contact force with the rod portion 11. As the result, when the opening/closing action of the valve body 10 creates up-and-down movement of the rod portion 11, frictional resistance against the seal ring 30 is reduced.

The mount bore disposed in the upper end portion of the valve housing 2A in the valve portion 2 fittingly engages the end portion of the main body 21 of the solenoid portion 21. This solenoid portion 20 disposes a sleeve 23 which has a bottomed cylindrical form and shares the same axis as the solenoid portion 20. A coil portion 22 is installed in the inner circumference of the main body. Besides, one distal end portion of the inner circumferential surface 23A of the sleeve 23 fits the outer circumferential surface 24A of the moveable attraction element 24 in freely moveable manner. The other end portion of the inner circumferential surface 23A of the sleeve 23 securely engages the fixed attraction element 25. And the moveable attraction element 24 is connected with one end portion of the solenoid rod 26. In addition, the other end surface of the solenoid rod 26 is kept in contact with the end face of the rod portion 11. The outer circumferential sliding surface 26A of the solenoid rod 26 forms a clearance fit with the guide bore 25A of the fixed attraction element 25. When an electric current is supplied to the coil portion 22 via electric wires connected to the top portion of the solenoid portion 20, the moveable attraction element 24 is attracted to the fixed attraction element 25. When the current is shut off the moveable attraction element 24 is resiliently urged by the first spring 42, thereby lifting from the fixed attraction element 25. Therefore, the moveable attraction element 24 makes the valve body 10 move via the solenoid rod 26 according to the intensity of the current supplied to the solenoid portion 20, thereby alternately lifting from or resting on the first valve seat 3 and the second valve seat 4. The moveable attraction element 24 is resiliently urged toward the valve body 10 side by means of an auxiliary spring 41 which gives a smaller spring force than the first spring 42.

In the control valve 1 thus constructed, the valve body 10 is actuated by joining the valve body 10 with the rod portion 11 and making the solenoid rod 26 in contact with the rod portion 11. The valve body 10 is urged by the first operating fluid P1 acting on the valve body 10 during the opening/closing action of the valve body 10. Unbalanced operating force of the first operating fluid P1 acting on the valve body 10 deteriorates the accuracy of an operating force operated in accordance with the intensity of the current supplied to the solenoid portion 20. It may also affect forces given by the first spring 42 and the auxiliary spring 41 carefully designed. The force acted on the valve body 10 by the first operating fluid P1 is arranged to be cancelled by the force given by the first operating fluid P1 acting on the opposite end face of the rod portion 11 relative to the valve body 10. At the same time, configuration of the seal ring container portion 17 and the seal ring 30 not only prevents the first operating fluid P1 from leaking through the fit clearance gap between the rod portion 11 and the guide surface 5A, but also reduces frictional resistance of the seal ring 30 relative to the rod portion 11. As a consequence, the opening/closing action of the valve body 10 is determined by an operating force of the solenoid portion 20 and respective spring forces of the first spring 42 and the auxiliary spring 41. Therefore, opening/closing of the valve body 10 can be controlled to operate as specified in accordance with the intensity of the current supplied to the solenoid portion 20.

Figure 3:
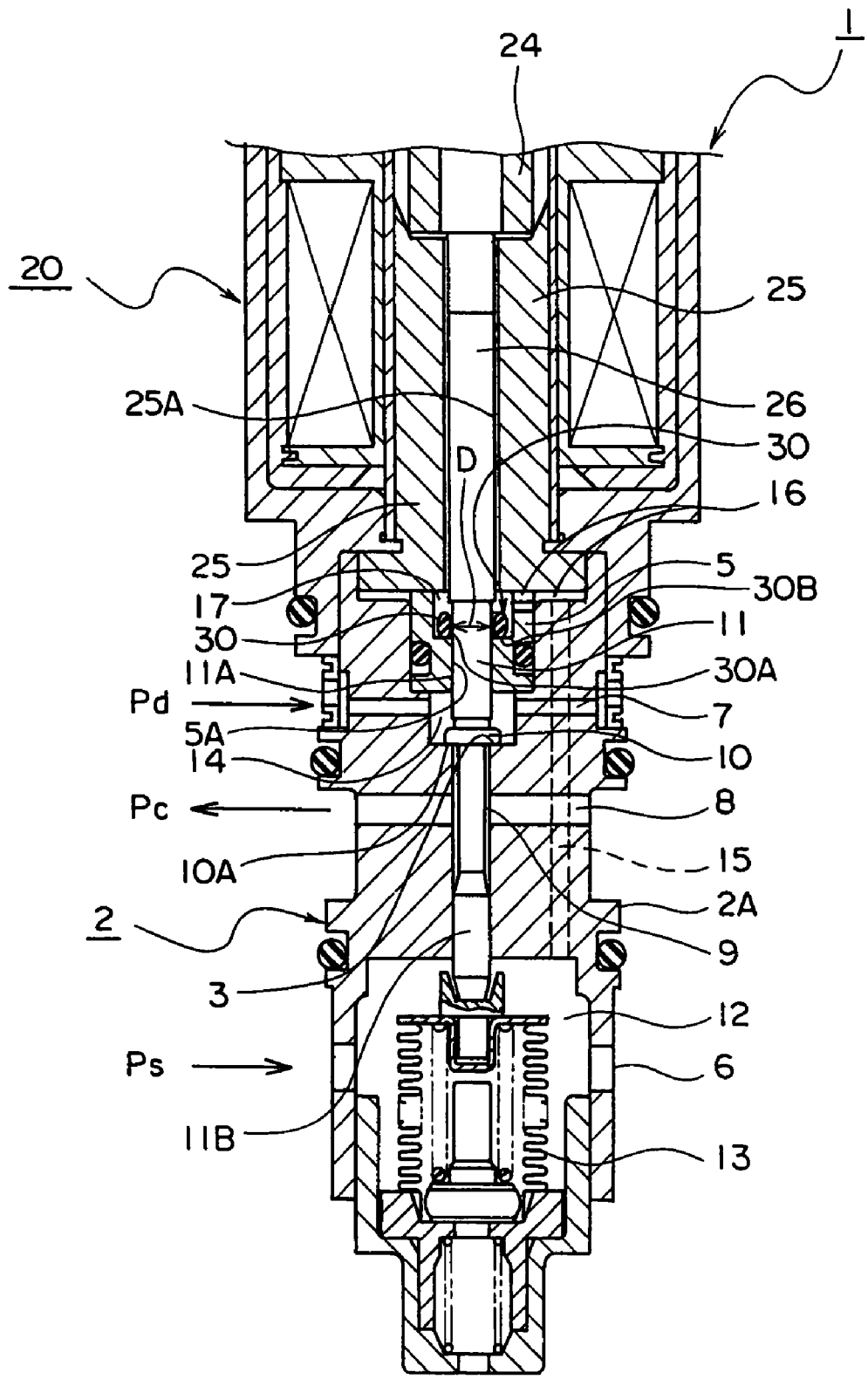
FIG. 3 is a cross-sectional view of a portion of a control valve as a second embodiment of the present invention.

FIG. 3 illustrates a control valve 1 of the second embodiment relative to the present invention. In FIG. 3, the valve housing 2A disposes a large bore at one end of the through hole. Secure engagement of a support portion in a bore closing relationship forms a pressure-sensing chamber 12 therewithin. Within the pressure-sensing chamber 12 there is mounted a pressure-sensing element 13 which is retained by the support portion. Outer circumference in the end portion of the valve housing 2A defines a joint portion by means of which the solenoid portion 20 is joined with the valve housing 2A. Thus assembling the valve portion 2 and the solenoid portion 20 comprises the control valve 1.

There is disposed a slide bore as a part of the through bore of the valve housing 2A next to the pressure-sensing chamber 12, which communicates with the pressure-sensing chamber 12 and whose diameter is smaller than that of the pressure-sensing chamber 12. Furthermore, a control fluid passage 9 is disposed in the through hole which communicates with the slide bore. A valve chamber 14 is further formed in the through hole in communication with the control fluid passage bore 9 in which the valve chamber 14 is larger in diameter than the control fluid passage bore 9. And besides, at the further end of the through hole, there is disposed a two-step shoulder bore consisting of a first mount bore and a second mount bore in which the first mount bore is larger in diameter than the valve chamber 14, communicates with the valve chamber 14 and fittingly engages a flange portion formed in the lower part of the fixed attraction element 25, in which the second mount bore securely engages the rod support portion 5. The periphery of the opening at the interface between the valve chamber 14 and the control fluid passage bore 9 defines a first valve seat 3. A surface having the first valve seat 3 may be arranged as a tapered surface inclined toward the control fluid passage bore 9.

Figure 4:
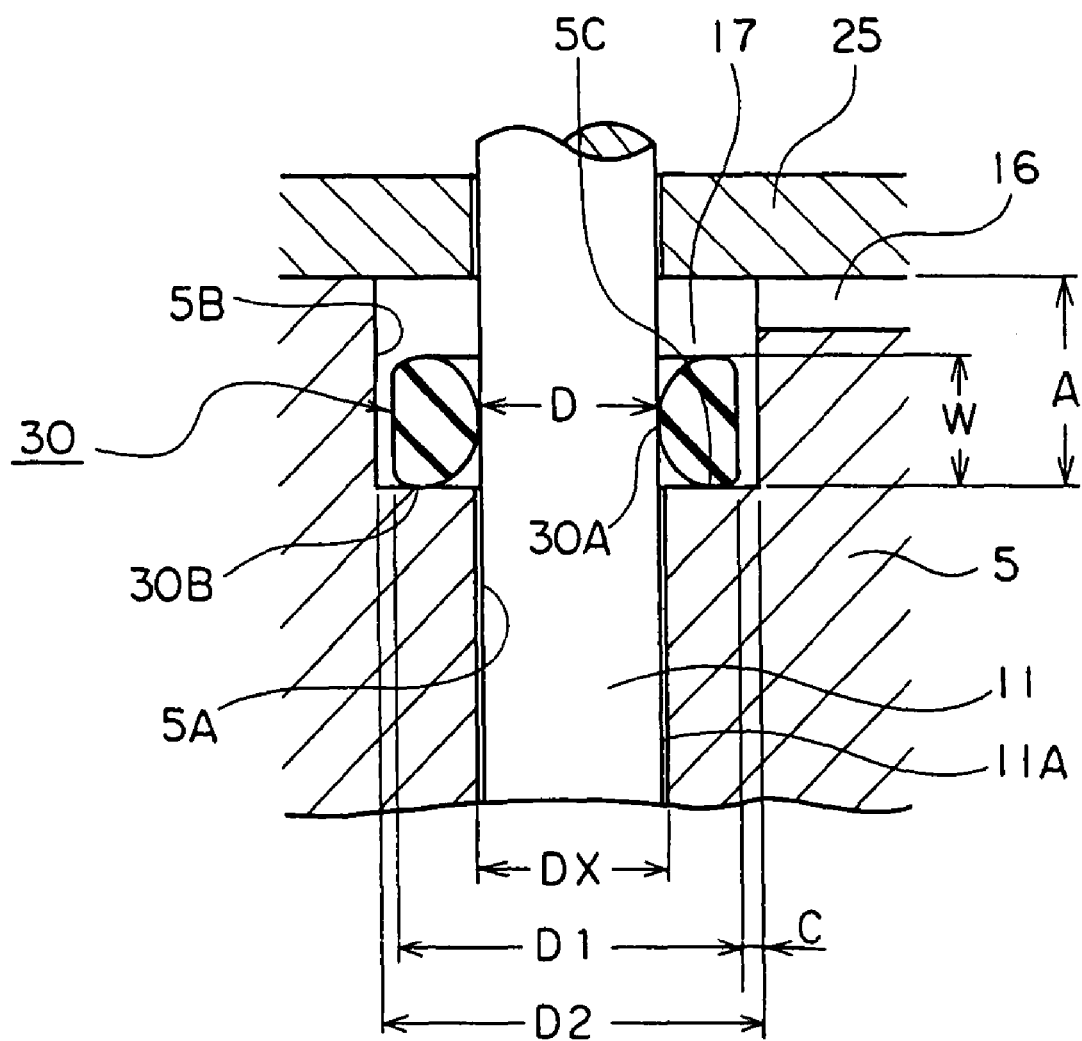
FIG. 4 is an enlarged cross-sectional view of a seal ring container portion and a seal ring disposed in the seal ring container portion shown in FIG. 3.

Further explanation is given by referring to FIG. 4 as well. FIG. 4 is an enlarged drawing of a portion of the rod support portion 5. The second mount bore of the valve housing 2A sealingly secures the rod support portion 5 via O-ring. A seal ring container portion 17 is disposed in the upper portion of the rod support portion 5 in the figure. The seal ring container portion 17 has an identical form with the rod support portion 5 in FIG. 1, thereby defining a circumferential wall 5B and a contact surface 5C therein. On the end surface there are disposed a plurality of introduction passages 16 slotted like grooves which are equally spaced along the circumferential surface. Dimensional relationship between diameter "D1" of the outer circumferential surface of the seal ring 30 and diameter "D2" of the contact surface 5B as well as dimensional relationship between diameter "D" of the outer circumferential surface 11A of the rod portion 11 and inner diameter "DX" of the guide surface 5A are similar to the dimensional relationship in FIG. 1 between the rod support portion 5 and the seal ring 30. The guide surface 5A of the rod support portion 5 provides a guide when the rod portion 11 makes a relative movement. And the seal ring 30 is disposed within the seal ring container portion 17. The inner circumferential surface 30A of the seal ring 30 forms a seal-tight contact with the outer circumferential surface 11A of the rod portion 11. Side wall 30 of the seal ring 30, at the same time, forms a sealing contact with the contact surface 5C. Besides, the seal ring 30 prevents the operating fluid Ps from leaking to the clearance gap between the outer circumferential surface 11A of the rod portion 11 and the guide surface 5A. The seal ring 30 has a "D"-shape cross section and is made of rubber or resin material. The inner circumferential surface of the semi-circle cross section of the seal ring 30 has a diametral dimension "D". A clearance "C" between the cut-off surface in the outer circumference of the seal ring 30 and the contact surface 5B is arranged so as not to vanish even when the seal ring 30 is elastically deformed along the surface due to pressure of the operating fluid Ps.

In the valve housing 2A thus arranging the rod support portion 5, the valve housing 2A disposes a second fluid passage 7 communicating the valve chamber 14 (refer to FIG. 3). Control fluid Pd is introduced from the second fluid passage 7. The control fluid Pd flowing in from the second fluid passage 7 is then introduced into the control fluid passage bore 9 when the valve body 10 opens. Furthermore, in order to discharge the control fluid Pd introduced from the second fluid passage 7 in valve opening to a control chamber, not shown, a third fluid passage 8 is disposed in the control fluid passage bore 9 in a communicating manner. A couple of the third fluid passages 8 are disposed in equally spaced locations along the outer circumferential surface of the valve housing 2A. Besides, the valve housing 2A disposes an auxiliary passageway 15 by means of which the pressure-sensing chamber 12 communicates the seal ring container portion 17. The auxiliary passageway 15 and the seal ring container portion 17 are communicated with each other by the introduction passage 16.

The rod portion 11 is inserted to the through bore passing through the axis of the valve housing 2A. The rod portion 11 disposes a valve body 10 and a rod member 11B which makes a slide movement relative to the slide bore. Diameter of the rod member 11B is arranged more or less the same as the diameter "D" of the rod portion 11. A portion of the rod member 11B which fits the control fluid passage bore 9 is arranged smaller in diameter than the rod member 11B in order to form a communication passage for permitting the operating fluid Pd to pass therethrough. Also the valve body 10 makes opening/closing actions relative to the first valve seat 3. The end face of the rod portion 11 and the end face of the solenoid rod 26 are in contact and joined with each other, and the both elements move in a synchronized manner.

The solenoid rod 26 is joined in an integral manner with a moveable attraction element 24 which is disposed within the sleeve in freely moveable manner. In the opposite location relative to the moveable attraction element 24, a fixed attraction element 25 is secured inside the sleeve and end portion thereof securely engages the first mount bore of the valve housing 2A. And besides, the solenoid rod 26 is arranged to form a loose fit with the guide bore 25A of the fixed attraction element 25 in freely slidable a manner. And the clearance gap between the solenoid rod 26 and the guide bore 25A permits to introduce the operating fluid Ps from the introduction passage 16 thereto.

Next, the first fluid passage 6 communicates the pressure-sensing chamber 12 of the valve housing 2A. A couple of first fluid passages 6 are disposed in equally spaced locations along the circumference of the valve housing 2A. The first fluid passage 6 introduces the operating fluid Ps from the external to the pressure-sensing chamber 12. The operating fluid Ps operates so as to contract the pressure-sensing means 13 within the pressure-sensing chamber 12. The pressure-sensing means 13 operates in accordance with internal resilient force and external compression force by the operating fluid Ps and actuates the rod portion 11 in synchronization with the action of the solenoid portion 20. Operation of the solenoid portion 20 and the pressure-sensing means 13 opens or closes the valve body 10 being integral to the rod portion 11. The attraction force of the solenoid portion 20 is in proportion with the intensity of the current supplied to the coil portion. Other reference numerals relative to the control valve 1 in FIG. 3 is the same as those used in FIG. 1.

In the control valve 1 of the second embodiment, unwanted pressures caused by the operating fluid Ps or control fluid Ps acted on the valve body 10 and rod member 11B during the action of the valve body 10 can be opposed by an opposing pressure of the operating fluid Ps acted via seal ring container portion 17 on the end face (pressure-receiving surface) of the rod portion 11, thereby canceling the unwanted pressures acted on the entire rod portion 11. The seal ring 30, at the same time, prevents the operating fluid Ps from leaking from the seal ring container portion 17 into the valve chamber 14. Sliding friction of the seal ring 30 relative to the rod portion 11 can be reduced by taking the aforementioned configuration. As the result, it becomes possible to open or close the valve body 10 solely by the urging force of the solenoid portion 20, urging force of the pressure-sensing element 13 and designed pressure such as the spring force and the like. And the opening/closing response of the valve body 10 relative to the first valve seat 3 is enhanced.

Figure 5:
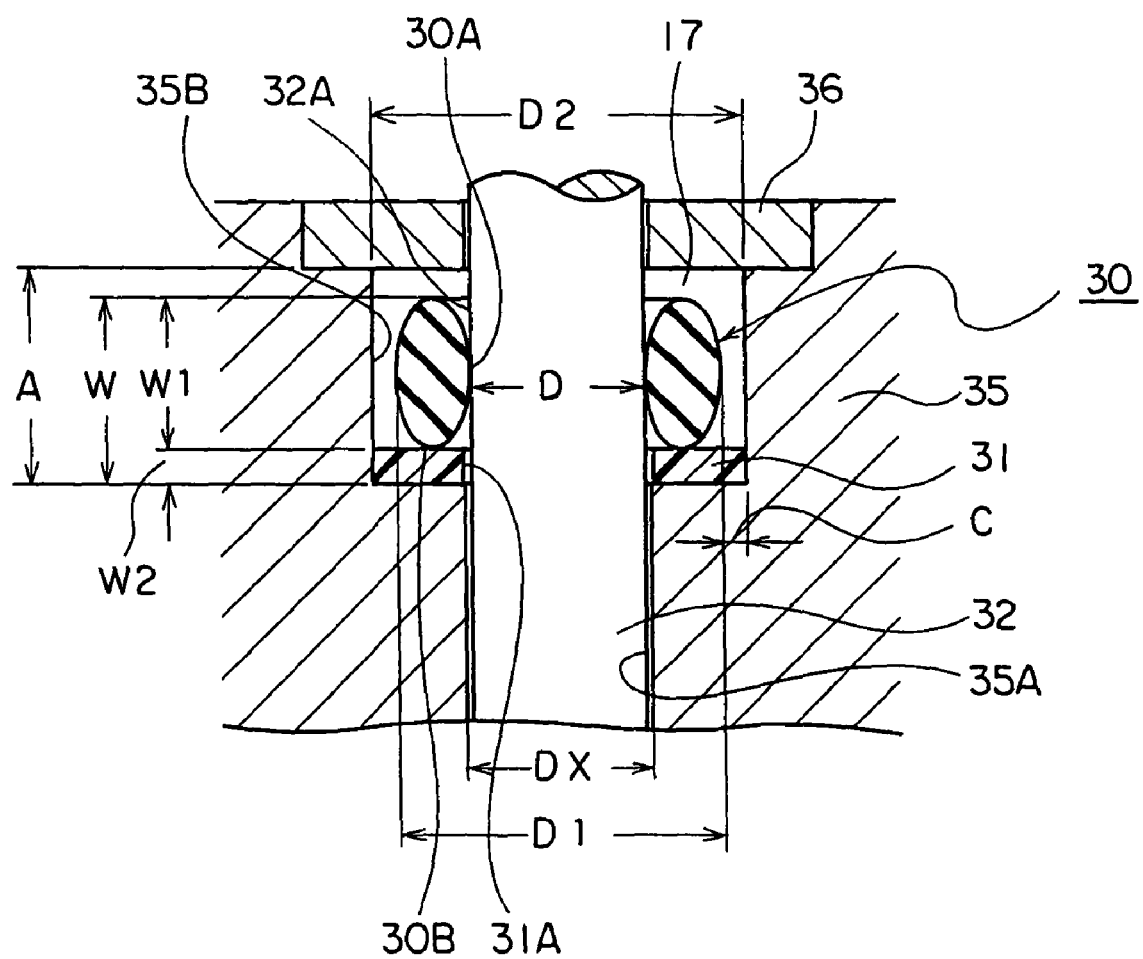
FIG. 5 is a cross-sectional view of the seal structure as a third embodiment of the present invention.
Figure 6:
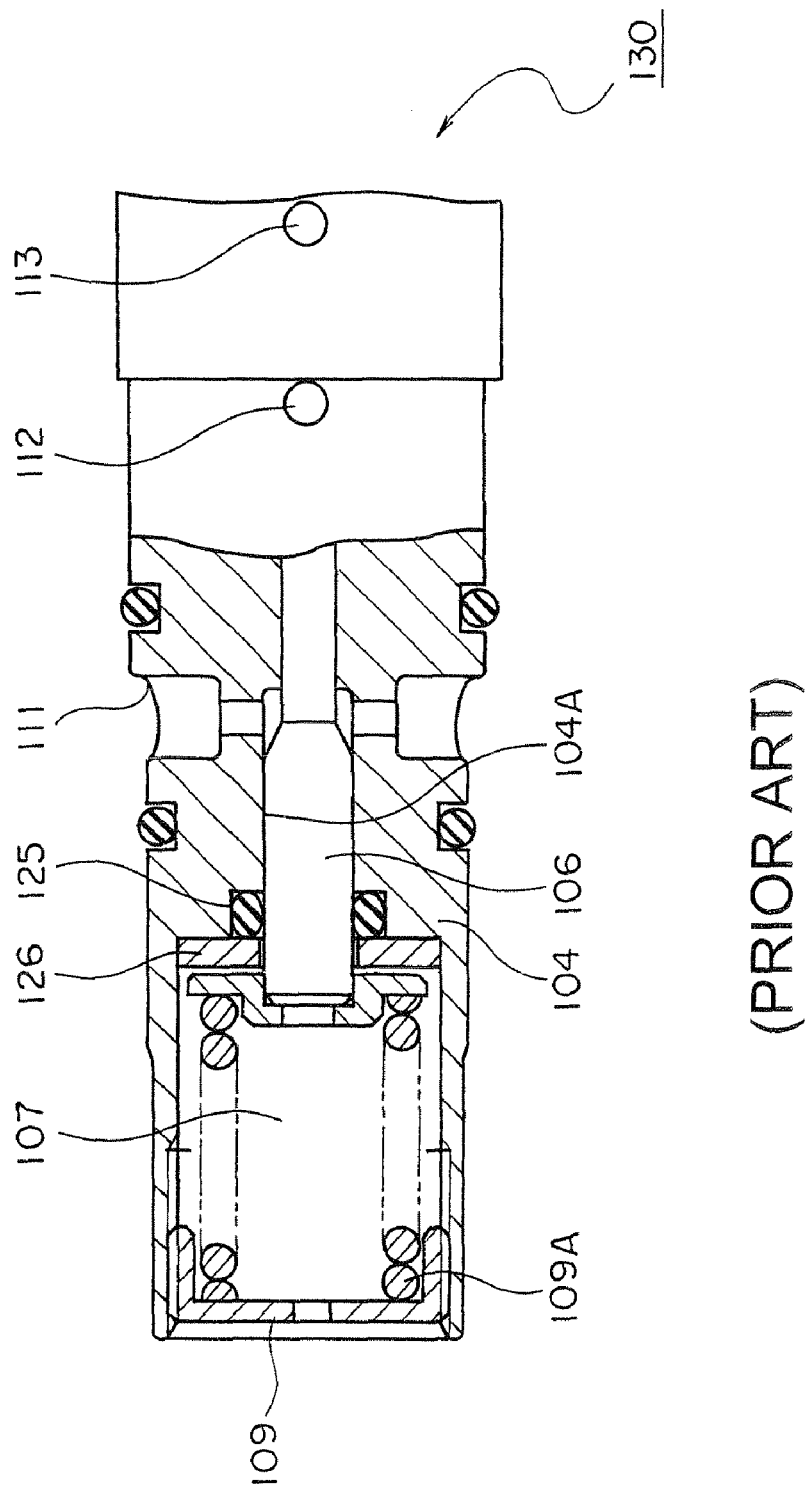
FIG. 6 is a cross-sectional view of a portion of a solenoid valve as a prior art similar to the present invention.

FIG. 5 illustrates a seal structure of the seal ring 30 related to the third embodiment of the present invention. This seal ring 30 represents a case where pressure of the sealed fluid (operating fluid) is exerted from the above direction in the figure. This type of seal structure is employed in a pump, pneumatic machinery, compressor, instrument and the like. The housing 35 disposes a guide surface 35A which serves as a bearing. In the figure above of the guide surface 35A, the opening of the recess is sealed by a retaining portion 36, thereby defining a seal ring container portion 17. A rotary shaft 32 extends through the seal ring container portion 17 as well as the guide surface 35A. There are disposed a seal ring 30 and a backup ring 31 in the seal ring container portion 17. The seal ring 30 is made of rubber material and in an elliptical form design. And the backup ring 31 is made of resin material and also in a ring form. The side wall 30B of the seal ring 30 is arranged to maintain a contact state with the backup ring 31. The backup ring 31 is arranged to form a small clearance between inner circumferential surface 31A thereof and the outer circumferential surface 32A of the rotary shaft 32. The seal ring 30 may have an "O"-shape cross section. Alternatively the cross section of the seal ring 30 may be arranged to be a hexagon or an octagon.

Diameter "D" of the outer circumferential surface 32A of the rotary shaft 32 and diameter of the inner circumferential surface 30A of the seal ring 30 are determined so as to form a seal-tight fit engagement thereby. Also the outer diameter "D1" of the seal ring 30 is arranged smaller than the inner diameter "D2" of the circumferential surface 35A of the seal ring container portion 17. This clearance gap C (=(D2−D1)/2) is arranged to keep the outer circumferential surface of the seal ring 30 in a non-contacting state with the circumferential surface 35B of the seal ring container portion 17 even when the seal ring 30 is forced to undergo elastic deformation due to compression by the sealed fluid. And besides, diametral dimension "DX" of the guide surface 35A is arranged slightly larger than the diameter "D" of the outer circumferential surface 32A of the rotary shaft 32 by approximately 0.02 mm to 0.8 mm. In addition, width "W1" of the seal ring 30 in axial direction thereof and width "W2" of the backup ring 31 in axial direction thereof have a dimensional relation W1+W2=W and "W" is arranged to be smaller than the width "A" of the seal ring container portion 17 in axial direction thereof.

As the outer circumferential surface of the seal ring 30 keeps a clearance gap "C" relative to the circumferential surface 35B, receiving the pressure of the sealed fluid and the presence of the circumferential surface 35B of the seal ring container portion 17 do not restrict elastic deformation thereof. Therefore, the inner circumferential surface 30A of the seal ring 30 is prevented from sliding under an intensive contact with the outer circumferential surface 32A of the rotary shaft 32. Furthermore, though there was a conventional problem in which the seal ring 30 forming an intensive contact with the outer circumferential surface 32A of the rotary shaft 32 increased slide friction thereof, such a substantial slide friction can be reduced by adopting the seal structure of the seal ring 30 of the present invention. Besides, a small slide friction in the seal ring 30 implies enhancement of durability thereof because of wear prevention of the inner circumferential surface 30A of the seal ring 30.

Construction and operational effect of other embodiments related to the present invention will be described below.

A control valve using the seal structure of the first invention related to the present invention is comprised of an opposing valve seat being disposed in a valve chamber and opposing the valve seat, a first fluid passage communicating with the opening of the opposing valve seat and communicating with the auxiliary passageway, a second fluid passage being able to communicate with the opening of the opposing valve seat and being able to communicate with the opening of the valve seat, and a third fluid passage communicating with the second fluid passage via the opening of the valve seat wherein the valve body opens and closes the opposing valve seat and the valve seat in an alternate manner.

According to the control valve using the seal structure related to the first invention, by using the seal ring with less slide friction, a force exerted on the valve body by the operating fluid pressure running the first fluid passage can be met by applying the operating fluid pressure from the first fluid passage onto the opposite end relative to the rod portion via auxiliary passageway, thereby canceling the both axial forces acted on the valve body. Therefore, unwanted forces acting on the valve body during the valve opening/closing actions are canceled and the valve body can be actuated by only proper actuation means. And a response of the valve body's opening/closing actions relative to the valve seat is enhanced. Reduction in the slide friction of the seal ring relative to the rod portion also improves the response of the valve body by means of the actuation means.

In a control valve using the seal structure of the second invention related to the present invention, the actuation means is comprised of a solenoid portion which disposes attraction elements mutually attracting in accordance with the intensity of an electric current supplied thereto.

According to the control valve using the seal structure related to the second invention, the solenoid portion operates according to the current intensity. Therefore an increase in the resistance of rod portion worsens the operational accuracy of the solenoid portion. However, as a slide friction between the seal ring and the rod portion can be reduced, it is effective in that outstanding opening/closing response of the valve body is exhibited in accordance with the current of the solenoid portion.

In a control valve using the seal structure of the third invention related to the present invention, the seal ring is made of rubber or resin material and the inner circumferential surface in the cross section is of a circular arc form.

According to the control valve using the seal structure related to the third invention, as the seal ring is made of rubber or resin material, the circular arc surface in the inner circumference of the seal ring makes a contact with the outer circumferential surface of the rod portion and the contact surface by a minimal contact area. Therefore, a sharp surface pressure realized on the seal face not only can enhance seal ability but also can make the slide resistance of the rod portion minimal and improve the response of valve body. At the same time, the seal ring made of rubber or resin material minimizes a frictional resistance and can effectively prevent the operating fluid from leaking through the clearance gap between the rod portion and the guide surface toward the valve chamber side.

INDUSTRIAL APPLICABILITY

As described above, a seal structure and a control valve using the seal structure of the present invention is suitable for sealing a sealed fluid which flows through the clearance gap between the rod portion and the housing in a control valve, pneumatic machinery, compressor and the like, and is advantageous for being able to reduce slide resistance of the rod portion and its outstanding opening/closing response of the valve body disposed in the rod portion.

The invention claimed is:

1. A control valve using a seal structure for opening/closing a valve body by means of an actuation means for flowing sealed fluid, said control valve comprising:
   a) a rod portion disposing said valve body;
   b) a guide surface fitting said rod portion and providing a guide thereto;
   c) a seal ring container portion being disposed axially on one side of said guide surface and in the circumference of said rod portion in a surrounding manner, said seal ring container portion disposing a radially extending contact surface;
   d) a valve chamber being disposed axially on the other side of said guide surface and disposing a valve seat therein, said valve seat being formed at the periphery of a communication passage through which said sealed fluid flows in accordance with opening/closing actions of said valve body; and
   e) an auxiliary passageway communicating with said seal ring container portion and introducing the sealed fluid,
   wherein a seal ring is disposed in said seal ring container portion,
   wherein an inner circumferential surface of said seal ring forms a seal-tight contact with an outer circumferential surface of said rod portion,
   wherein said seal ring is in contact with said rod portion only in a radial direction to slide on the outer circumferential surface of said rod portion in an axial direction,
   wherein a side wall surface of said seal ring opposing said contact surface is in contact with said contact surface,
   wherein said seal ring and said seal ring container portion are configured such that an outer circumferential surface of said seal ring after elastic deformation due to a sealed fluid pressure is not in contact with a circumferential surface of said seal ring container portion, and
   wherein an opposing valve seat, a first fluid passage, a second fluid passage and a third communication passage are disposed, wherein said opposing valve seat is disposed in said valve chamber and opposes said valve seat, wherein said first fluid passage communicates with the opening of said opposing valve seat and communicates with said auxiliary passageway, wherein said second fluid passage is able to communicate with the opening of said opposing valve seat and is able to communicate with the opening of said valve seat, wherein said third communication passage communicates with said second fluid passage via the opening of said valve seat, wherein said valve body opens and closes said opposing valve seat and said valve seat in an alternate manner.

2. A control valve using the seal structure as claimed in claim 1 wherein said actuation means is comprised of a solenoid portion which disposes attraction elements mutually attracting in accordance with the intensity of an electric current supplied thereto.

3. A control valve using the seal structure as claimed in claim 1 wherein said seal ring is made of rubber or resin material and the inner circumferential surface in cross section thereof is of a circular arc form.

* * * * *